United States Patent [19]

Horton

[11] Patent Number: 4,883,305

[45] Date of Patent: Nov. 28, 1989

[54] COLLAPSIBLE CANOPY FOR PICKUP TRUCKS

[76] Inventor: Paul F. Horton, 9393 Hackamore Dr., Boise, Id. 83709

[21] Appl. No.: 306,040

[22] Filed: Feb. 6, 1989

[51] Int. Cl.⁴ .............................................. B60J 7/24
[52] U.S. Cl. .................................................... 296/105
[58] Field of Search .............................. 296/105, 100

[56] References Cited

U.S. PATENT DOCUMENTS

| | | | |
|---|---|---|---|
| 3,606,448 | 9/1971 | Walker | 296/105 |
| 3,874,721 | 4/1975 | Tuggle | 296/105 |
| 4,093,300 | 6/1978 | Snizsk | 296/180.2 |
| 4,252,363 | 2/1981 | Rodrigue | 296/100 |
| 4,553,781 | 12/1985 | Johnson | 296/180.4 |
| 4,721,336 | 1/1988 | Jones | 296/105 |
| 4,756,325 | 7/1988 | Daniels | 296/100 |
| 4,789,196 | 12/1988 | Fields | 296/100 |

Primary Examiner—Robert R. Song

[57] ABSTRACT

A collapsible canopy for vehicles having cargo beds and for pickup trucks, in particular. The canopy includes a pair of channel members suitable for mounting on the top side walls of a pickup box; slide members mounted within each channel member; a plurality of arch-shaped rigid stays, extending across the box and mounted adjacent and parallel with one another from the front toward the rear of the box, each stay affixed to respective slide members for reciprocal movement therewith; a flexible canopy cover engaging the stays; and latches for holding the stays in a spaced apart, extended mode so that the cover extends over the box. Elastic bands engaging the cover in parallel relationship between adjacent rigid stays draw the rigid stays together when the latch is released so as to collapse the cover for storage adjacent the back of the pickup cab.

16 Claims, 2 Drawing Sheets

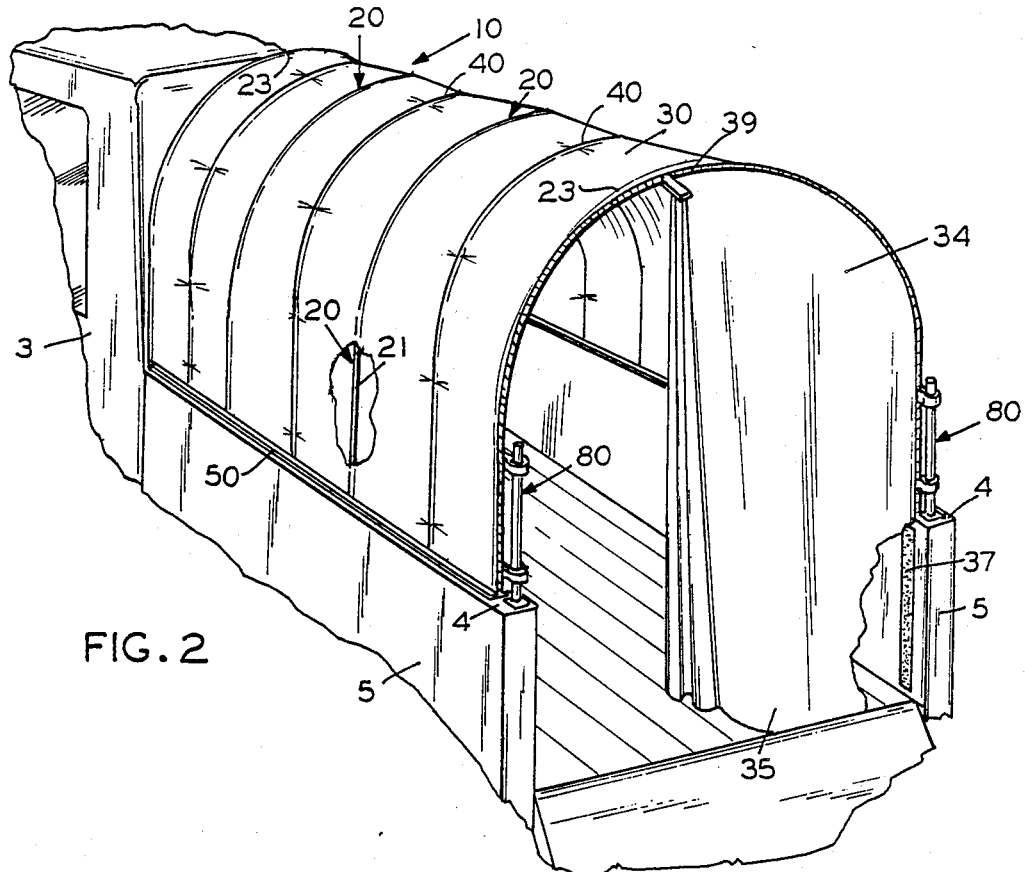
FIG. 2
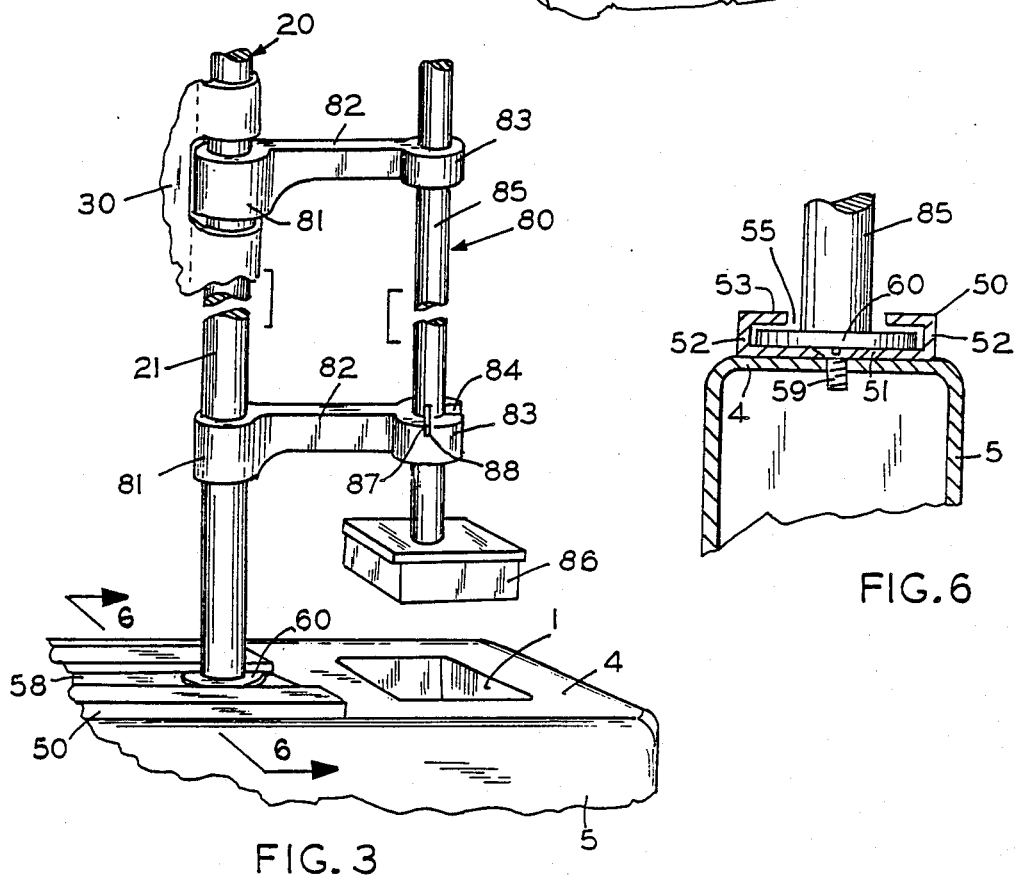
FIG. 3
FIG. 6

COLLAPSIBLE CANOPY FOR PICKUP TRUCKS

BACKGROUND OF THE INVENTION

1. Field of the Invention

This invention relates, in general, to canopies for vehicles and, in particular, to collapsible canopies for pickup trucks.

2. Description of the Prior Art

Canopies for covering the box of a pickup truck are very popular, in that they keep items placed within the box from the rain, sleet, and snow; from the wind and dust; and from the heat of the sun. Canopies are also commonly used by hunters and others for living accomodations.

Problems commonly associated with conventional canopies are that they must be removed entirely from the vehicle when hauling objects exceeding the height of the canopy; when objects will not fit through the door of the canopy; or when placement of the object into the pickup must be made from overhead, such as placement of heavy equipment which must be lowered by a hoist. Additionally, it is often desirable to haul items of excessive size, such as motorcycles, snowmobiles and the like to remote areas and yet, when the destination is reached, a canopy is needed. To overcome these problems, it is essential that the canopy be collapsible. It is also highly desirable that the canopy be compactly stored; readily set up; not require extensive modification of the vehicle; and be cost efficient.

SUMMARY OF THE INVENTION

The present invention overcomes these and other problems by providing a canopy having a flexible cover mounted on a series of rigid arch-like stays which are reciprocally moveable along a pair of opposing elongated channel members mounted on the top surface of the side wall of a pickup truck. The rigid stays are provided with slide members held within the channel members for movement of the stays and cover from a compact storage mode adjacent the back of the pickup cab to an extended position covering the entire bed of the truck, where the stays are latched into position. Elastic bands interspersed between rigid stays serve to draw the canopy back into the storage mode upon release of the latch.

DESCRIPTION OF THE DRAWINGS

FIG. 2 is a perspective view from the rear of the canopy of FIG. 1, showing the rear wall in partial section.

FIG. 3 is a perspective view of one embodiment of the rear latch of the invention.

FIG. 6 is a sectional view taken along lines 6—6 of FIG. 3.

DETAILED DESCRIPTION OF THE INVENTION

Figure 1:
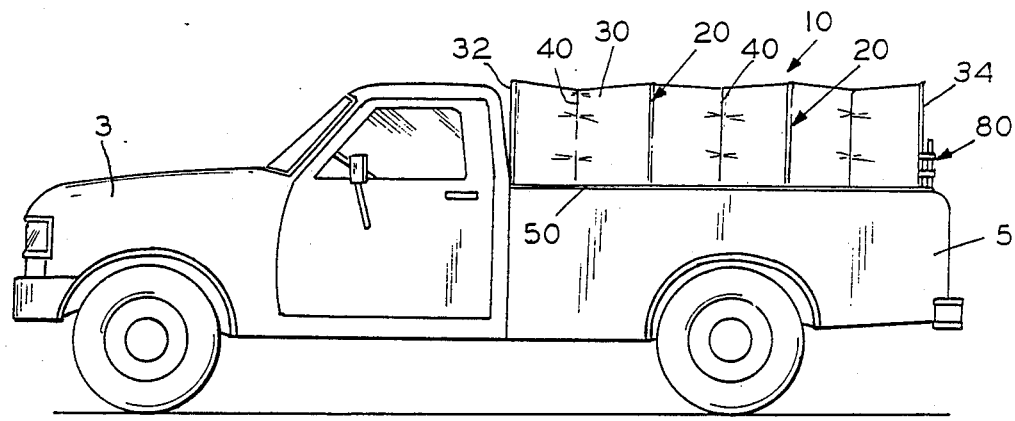
FIG. 1 is a side view of a pickup truck provided with the collapsible canopy of the present invention, shown in the extended, covering mode.

Referring now to the drawings, and, more particularly to FIGS. 1,2, and 3, an embodiment to be preferred of a collapsible canopy 10, made according to the present invention is disclosed. Canopy 20 includes, generally, a plurality of rigid bands 20; a flexible cover 30; a plurality of elastic stays 40; guide means including a pair of elongated channel members 50 mounted onto the top of side walls 5 of a pickup truck 3; a plurality of slide members 60 received within the channel members; and latch means, designated generally by the numeral 80, for holding the canopy in an extended mode, as shown in FIG. 1.

Channel members 50, one of which is shown in FIG. 6, are substantially C-shaped in cross-section, having a base member 51, a pair of opposing side members 52, and a top member 53 defining an elongated slot 55 which extends the length of the channel member. The base member 51 may be provided with a series of aligned, countersunk holes, spaced along the length of the channel member for receiving mounting screws 59. Using the channel member as a template, a series of holes may be drilled into the horizontal top plate 4 of the sidewall 5 of the pickup box, each hole being in registry with a respective screw hole of the channel member. The two elongated channel members are each attached to respective sidewalls in parallel relationship with one another. On a flatbed, the channel members are attached adjacent opposing edges, along the length of the bed. The channel members may be formed or extruded of any suitable material.

Rigid stays 20 are arch-shaped in construction and are preferably made of tubular aluminum or steel, but may be constructed of solid fiberglass or plastic. While the stays may be formed into a semi-circular hoop; for added room within the canopy, it is contemplated that each stay will have a pair of upright, substantially vertical, parallel legs 21 connected by a curved transverse top member 23, as shown in FIG. 2. The term "rigid" as used herein and in the appended claims includes stays which are capable of holding their shape within the mode of use. Each leg 21 of each stay 20, which is to be reciprocally moved and held in position by the channel members, is provided at its lowermost end with a slide member 60, as shown in FIGS. 3 and 6. Slide members 60 may be affixed to legs 21 by any suitable means such as by welding, glue, screws, and the like. The slide members are preferably constructed of or covered by low friction material such as Teflon®, or any other material readily slideable within channel 58 defined by member 50, and are preferably washer shaped in construction, also to aid in their sliding contact with the channel member. It will be seen that leg member 21 of rigid stay 20 engages the slide member through elongated slot 55 of channel member 50 for reciprocal movement of the rigid stays along the channel members. Slide members 60 are of sufficient width to prevent accidental displacement from the channel member.

Affixed to the rigid stays is a flexible fabric cover 30; constructed of nylon or other tenting material. The cover, rectangular in shape, is fastened to each rigid stay by interior loops, sleeves, or the like, and assumes the arch-shaped construction of the rigid stays in draping over or under the stays. The length of the cover is substantially equal to the length of the bed or box it is to cover and has a width substantially equal to the periphery of the rigid stays to enclose the box or bed of the vehicle. Affixed to the front end of the cover is an arch-shaped front wall 32 for enclosing the front of the cover. The front wall is preferably of fabric and made of the same material as the cover. The front wall may be provided with a screened opening, coverable by a fabric flap, as is conventional in many tents. Also affixed to cover 30 is a rear wall 34, shown to advantage in FIG. 2. Rear wall 34 is also preferably constructed of the same fabric material as the cover and defines a closeable opening for entering and exiting the canopy. The rear wall may be attached to the cover by a zipper mechanism 39 for opening and closing the wall and also for removal of wall 34, when desired. It will be observed that the rear wall, while arch shaped like the rigid stays, may included extension member 35 to enclose the rear of the cover down to the bed of the vehicle. To provide lateral support for the extension member, attachment means 37 may be provided. Attachment means 37 is preferably in the form of hook-loop mating strips, sold under the trademark, Velcro ®. One, first strip, with adhesive backing, is applied to each of the interior side walls of the pickup box, in vertical orientation adjacent the tail gate and the second, mating strips are each affixed to opposing sides of extension member 35 so as to be in registry with the first strips for easy fastening or opening. If desired, an apron, not shown, may be provided along the lower edge of the cover and front wall to overhang the front and sidewalls of the pickup box to deflect rain, snow, and the like from the box.

For collapsing the canopy and to make the cover taut when extended, cover 30 is provided with a plurality of elastic bands 40, affixed to the cover. Elastic stays 40 may be attached directly to the cover, as by stitches, or may be contained or supported by fabric sleeves or loops. The elastic bands are each mounted between and parallel with rigid stays 20. The elastic bands may be constructed of any suitable material, such as rubber.

Conventionally, the side walls 5 of the box of a pickup truck include on their upper surface, a square opening 1, as shown in FIGS. 2 and 3, both at the front and rear of the side wall for insertion of a rack. The latch means of the present invention takes advantage of these existing openings, but where such openings may be absent, openings of any desired shape may be drilled or otherwise formed on the top of the sidewall.

Figure 4:
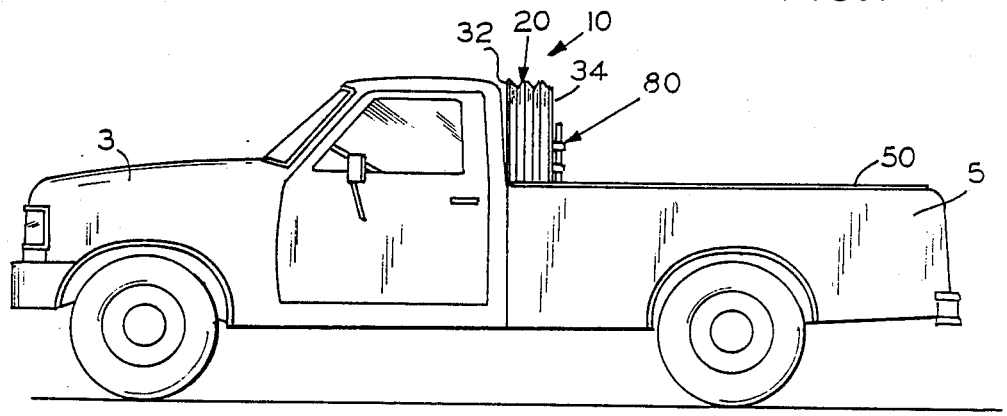
FIG. 4 is a side view of the pickup truck and canopy of FIG. 1, showing the canopy in the collapsed, storage mode.

For latching the first rigid stay, i.e., the forwardmost stay adjacent the front end of the box, the stay may include legs 21 which are longer in length than all other rigid stays so as to engage holes 1 in the top of the side wall. The first rigid stay may therefore have legs substantially equal in size and configuration to hole 1 to snugly engage the hole to hold the stay in a fixed vertical position. All other rigid stays are mounted with their legs held in position within opposing channel members 50, and may be inserted into the channel members through an open end of the members. It will be seen, then, as the rigid stays are moved in the channel members, from the position shown in FIG. 4, toward the back of the pickup truck 3, that cover 30 is drawn to its extended covering position over the pickup box, in resistance to the bias of elastic bands 40, to the position shown in FIG. 1.

For holding the canopy in an extended, covering mode, latch means, designated generally by the numeral 80 and shown to advantage in FIGS. 2 and 3, may be used. Latch means 80 may take many different forms, a specific form being described herein. In the embodiment shown, vertically spaced clamps 81 are affixed to each of the legs 21 of the rearmost rigid stay 20. Each clamp supports a framework 82 provided with a sleeve 83, having a vertical slot 84. Contained within each sleeve 83 for sliding engagement therewith is a latch rod 85 carrying, at its lowermost end, a support block 86 having a configuration substantially the same as hole 1 for snug engagement therewith. Should hole 1 be circular in shape, then, of course, block 86 will likewise be circular in shape. Rod 85 carries with it a key 87 adapted to fit into a notch 88 on the sleeve to support block 86 above the sidewall 5 of the pickup truck. Once the rearmost rigid stay is pulled adjacent hole 1, rods 85 are simply lifted and rotated so that the keys slide through slots 84 of lower sleeves 83, thus dropping blocks 86 for placement into holes 1 of sidewalls 5 to latch the canopy into position in the extended, covering, position. In this position, the elastic bands 40 are stretched to their maximum to provide a taut cover 30. To return the canopy to the collapsed position, shown in FIG. 4, blocks 86 of latch means 80 are simply lifted from their respective holes 1 and keys 87 returned to the position shown in FIG. 3. Elastic stays 40 then draw the rigid bands and cover into the collapsed position. It is obvious, should it be desired, that a latch means as shown may also be used for securing the first rigid stay 20 adjacent the front of the pickup box.

Figure 5:
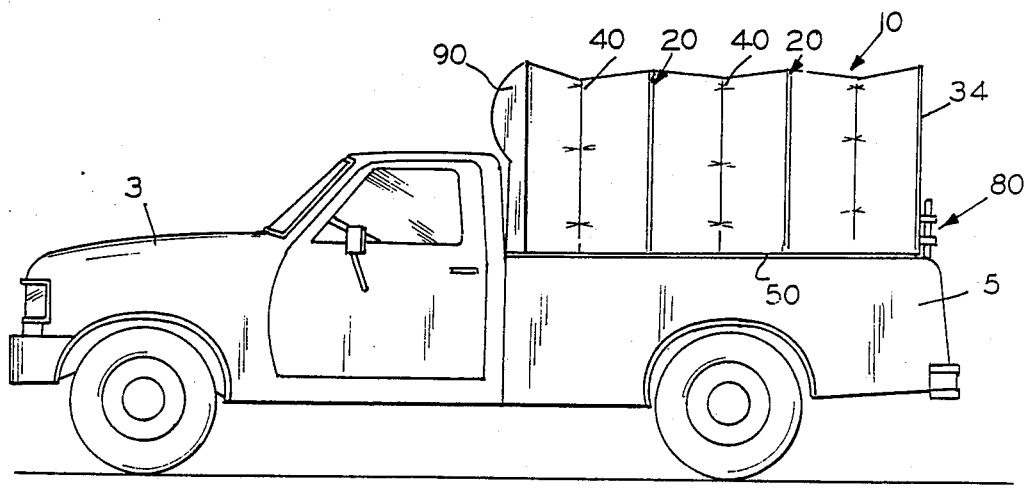
FIG. 5 is a side view of a pickup truck provided with a second and taller embodiment of the invention, utilizing a wind deflector.

Referring now to FIG. 5, a second embodiment of a canopy 10 made according to the present invention is disclosed. This embodiment is identical to the canopy above described, except as to the height of the canopy and the inclusion of a wind deflector 90, and therefore description shall be limited to those differences. Because one may wish to stand up in the canopy, and for holding objects of greater height, rigid stays 20 are simply increased in height and cover 30 and both front and backs walls 32 and 34, respectively also increased in size. In that the canopy may extend substantially above cab 8 of vehicle 3, it is highly desirable to provide a wind deflector. Wind deflector 90 has a depth substantially equal to the canopy in the collapsed mode, so as to surround the collapsed canopy on top, front, and sides. The deflector may be mounted separately to the pickup cab or box or may simply be made a part of the first rigid stay, being secured to the box by the stay. Deflector 90 may be constructed of any suitable material and is preferably designed for minimum wind resistance.

Having thus described in detail preferred embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A collapsible canopy for a vehicle with cargo bed comprising:
   elongated guide means positioned along each side of the cargo bed;
   a plurality of slide members mounted within said guide means for reciprocal movement therein;
   a plurality of rigid canopy stays; each of said stays substantially arch-shaped in construction having a pair of laterally spaced and upright leg members and a transverse member supported by said legs; each of said leg members attached to a respective slide for reciprocal movement along said guide means;

a flexible fabric cover engaging said rigid stays to define an arch-like covering for the bed when in the extended canopy mode;

a plurality of elastic bands, each of said elastic bands engaging said fabric cover between and in parallel relationship with said rigid stays for drawing said rigid stays into close opposition with one another in the collapsed canopy mode and to maintain a taut cover in the extended canopy mode; and latch means for holding said rigid stays in a spaced, front to rear relationship, when in the extended canopy mode.

2. The canopy as described in claim 1 wherein said guide means include a pair of elongated channel members, each of said channel members affixable to said vehicle.

3. The canopy as described in claim 1 further comprising a front end wall affixed to said cover.

4. The canopy as described in claim 1 further comprising a rear end wall affixed to said cover.

5. The canopy as described in claim 4 wherein said rear end wall includes entrance and exit means.

6. The canopy as described in claim 1 wherein said latch means includes a latch operable to hold the forwardmost rigid stay in close apposition to the front of the vehicle bed and a latch operable to hold the rearwardmost rigid stay in close approximation to the rear of the vehicle bed.

7. The canopy as described in claim 1 further comprising a rigid deflection member attached to the vehicle for deflecting air from said canopy during movement of the vehicle.

8. The canopy described in claim 7 wherein said deflection member is mounted on the forwardmost rigid stay of said canopy.

9. A collapsible canopy for a pickup truck having an open box, and having a horizontal bed, opposing side walls and a front wall, said canopy comprising:

a pair of elongated channel members, each of said channel members affixable to said vehicle in a laterally spaced, parallel, relationship with one another on respective side walls;

a plurality of slide members disposed within each of said channel members for reciprocal movement within and along the length of said channel members;

a stationary rigid stay affixed to said box adjacent the front wall of said box;

a plurality of movable rigid canopy stays, each of said movable stays substantially arch-shaped in configuration and each of said movable stays mounted in an upright position on respective opposed slide members for movement along said channel members;

a flexible fabric cover engaging said rigid stays;

a plurality of elastic bands, each of said elastic bands engaging said fabric cover between and in parallel relationship with said rigid stays for drawings said rigid stays into close apposition with one another in the collapsed canopy mode and to maintain a taut cover in the extended canopy mode; and latch means for holding said rigid stays in a spaced apart, extended mode for placement of said cover over the cargo bed.

10. The canopy as described in claim 9 further comprising a front end wall affixed to said cover.

11. The canopy as described in claim 9 further comprising a rear end wall affixed to said cover.

12. The canopy as described in claim 11 wherein said rear end wall is provided with an extension member to extend said rear wall to the bed of the pickup truck.

13. The canopy as described in claim 12 further comprising extension member attachment means for attaching said extension member to the box of the pickup truck.

14. The canopy as described in claim 11 wherein said rear wall defines a closeable opening for entering and exiting the canopy.

15. The canopy as described in claim 9 further comprising a wind deflector mounted on the pickup truck forward of said cover.

16. A collapsible canopy for a pickup truck having an open box, and having a horizontal bed, opposing side walls and a front wall, said canopy comprising:

a pair of elongated channel members, each of said channel members affixable to said vehicle in a laterally spaced, parallel, relationship with one another on respective side walls;

a plurality of slide members disposed within each of said channel members for reciprocal movement within and along the length of said channel members;

a stationary rigid stay affixed to said box adjacent the front wall of said box;

a plurality of movable rigid canopy stays, each of said movable stays substantially arch-shaped in configuration and each of said movable stays mounted in an upright position on respective opposed slide members for movement along said channel members;

a flexible fabric cover engaging said rigid stays;

a plurality of elastic stays bands, each of said elastic stays bands affixed to said fabric cover between and in parallel relationship with said rigid stays for drawings said rigid stays into close apposition with one another in the collapsed canopy mode and to maintain a taut cover in the extended canopy mode;

a front wall affixed to said cover for enclosing the front end of said cover;

a rear wall affixed to said cover for enclosing the rear end of said cover; and latch means for holding said rigid stays in a spaced apart, extended mode for placement of said cover over the cargo bed.

* * * * *